(12) United States Patent
Corbett et al.

(10) Patent No.: US 7,239,894 B2
(45) Date of Patent: Jul. 3, 2007

(54) USING DIRECTIONAL ANTENNAS TO ENHANCE THROUGHPUT IN WIRELESS NETWORKS

(75) Inventors: Christopher J. Corbett, Issaquah, WA (US); Warren V. Barkley, Millcreek, WA (US); Amer Aref Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 10/448,551

(22) Filed: May 30, 2003

(65) Prior Publication Data

US 2004/0242273 A1 Dec. 2, 2004

(51) Int. Cl.
*H04M 1/00* (2006.01)

(52) U.S. Cl. ............... 455/562.1; 455/11; 455/522; 455/561

(58) Field of Classification Search ........... 455/562.1, 455/561, 11.1, 522, 13.4, 445, 425
See application file for complete search history.

(56) References Cited

U.S. PATENT DOCUMENTS 6,493,545 B1 * 12/2002 Sugaya .................. 455/272
6,640,087 B2 * 10/2003 Reed et al. .............. 455/11.1
6,735,452 B1 * 5/2004 Foster et al. ............ 455/562.1
2001/0031624 A1 * 10/2001 Schmutz ................ 455/13.4
2003/0048770 A1 3/2003 Proctor, Jr.

FOREIGN PATENT DOCUMENTS

| WO | WO 02/50947 | 6/2002 |
| WO | WO 02/87096 | 10/2002 |

* cited by examiner

*Primary Examiner*—Quochien B. Vuong
*Assistant Examiner*—Michael Chu
(74) *Attorney, Agent, or Firm*—Workman Nydegger

(57) ABSTRACT

The principles of the present invention provides for using directional antennas to increase signal strength and enhance throughput in a wireless network. An antenna device includes an omni-directional antenna and at least one directional antenna. Each directional antenna (e.g., an electronically steered phased array antenna) can have one or more feeds for directing beams to wireless devices. The antenna device utilizes the omni-directional antenna to send and receive control data that facilitates locating wireless devices and determining when a wireless device is to send program data to or receive program data from the antenna device. The antenna device utilizes the directional antenna to send program data to and receive program data from wireless devices. Since the directional antennas use directional beams, the range and barrier penetration of directional antennas is greater than that of the omni-directional antenna.

34 Claims, 4 Drawing Sheets

USING DIRECTIONAL ANTENNAS TO ENHANCE THROUGHPUT IN WIRELESS NETWORKS

BACKGROUND OF THE INVENTION

1. The Field of the Invention

The present invention relates to wireless networks, and more specifically, to using directional antennas to increase signal strength and enhance throughput in wireless networks.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

For example, a number of computer systems can be coupled to a data hub through corresponding wired connections (e.g., category 5 cable) to form a wired network (e.g., an Ethernet segment). Similarly, a number of wireless computer systems (commonly referred to as "stations") can be coupled to a wireless access point ("AP") through corresponding wireless connections (e.g., resulting from appropriate communication between radio transmitters and receivers) to form a wireless network (e.g., an IEEE 802.11 network). Further, a data hub and/or an AP can be connected to other data hubs, APs, or other network devices, such as routers, gateways, and switches to form more complex networks (including both wired and wireless connections).

When computer systems communicate electronically, electronic data will often pass through a protocol stack that performs operations on the electronic data (e.g., packetizing, routing, flow control). The Open System Interconnect ("OSI") model is an example of a networking framework for implementing a protocol stack. The OSI model breaks down the operations for transferring electronic data into seven distinct "layers," each designated to perform certain operations in the data transfer process. While protocol stacks can potentially implement each of the layers, many protocol stacks implement only selective layers for use in transferring electronic data across a network.

When data is received from a network it enters the physical layer and is passed up to higher intermediate layers and then eventually received at an application layer. The physical layer, the lower most layer, is responsible for converting electrical impulses, light, or radio waves into a bit stream and vice versa. On the other hand, when data is transmitted from a computer system, it originates at the application layer and is passed down to intermediate lower layers and then onto a network. The application layer, the upper most layer, is responsible for supporting applications and end-user processes, such as, for example, electronic conferencing software, electronic mail clients, web browsers, etc.

An intermediate layer incorporated by most protocol stacks is the Data Link layer. The Data Link layer decodes data packets (received from higher layers) into bit streams for use by the physical layer and encodes bit steams (received from the physical layer) into data packets for use by higher layers. A sub-layer typically included in the Data Link layer is the Media Access Control ("MAC") layer, which implements protocols for moving data packets onto a shared channel (e.g., an Ethernet segment or an 802.11 channel).

However, to access a medium a computer system must be able to sense the medium. In a wireless environment, sensing a wireless medium (e.g., an 802.11 channel) can be difficult, and at times impossible, depending on how a station and an access point are physically separated. Access points typically include an omni-directional antenna. Accordingly, when no physical bariers exist (e.g., walls, floors, buildings, etc.), the range of the omni-directional antenna essentially results in a spherical region around the access point. When a station is within a particular range of the access point, the omni-directional antenna enables the access point to meaningfully send data to and receive data from the station. That is, within the particular range, transmitted radio signals have sufficient signal strength such that a physical layer can convert the radio signals into a bit stream.

However, when a station is at or near the range of an omni-directional antenna and/or is separated from an omni-directional antenna by physical bariers, radio signal propagation loss (e.g., in the 2.4 GHz band or 5 GHz band) can significantly reduce the speed and reliability of data transferred between a station and an access point. When the station is outside the range of the access point or when substantial physical bariers exist, meaningful communication between a station and an access point may not be possible. For example, due to propagation loss, an data rate can be significantly reduced essentially making communication with the omni-directional antenna impossible. Further, while am omni-directional antenna may have sufficient signal strength to detect that radio waves are being transmitted (e.g., from a station to an access point or vice versa), the signal strength may be degraded such that it is difficult, or even impossible, to determine what data is being represented by the radio waves. That is, a physical layer may not be able to generate a bit stream from the degraded radio waves. Therefore systems, methods, and computer program products for reducing the effects of propagation loss would be advantageous.

BRIEF SUMMARY OF THE INVENTION

The foregoing problems with the prior state of the art are overcome by the principles of the present invention, which are directed towards methods, systems, and computer program products for using directional antennas to increase signal strength and enhance throughput in wireless networks. An antenna device includes an omni-directional antenna and at least one directional antenna. Each directional antenna (e.g., an electronically steered phased array antenna) can have one or more feeds for directing beams to wireless devices. The antenna device can be an access point that provides wireless devices access to a network, such as, for example, to a Local Area Network or even to the Internet The omni-directional antenna receives a data notification signal from a wireless device. The data notification signal represents that the wireless device has program data to send to the antenna device. Based on the received data notification signal, the antenna device determines that the wireless device has program data to send to the antenna device. A data notification signal can be one or more bytes (e.g., of a request to send ("RTS") signal) that indicate to the antenna device that the wireless device has program data to send. The antenna device identifies that the wireless device is most likely within a range of a direction antenna selected from among the at least one directional antenna. For example, based on the signal strength associated with the data notification signal (as detected by the omni-directional antenna), the antenna device can at least estimate that the signal strength of the directional antenna is sufficient for receiving program data from the wireless device.

Since the directional antenna uses directional beams, the range and barrier penetration of the directional antenna is greater than that of the omni-directional antenna. Accordingly, the signal strength of the directional antenna may be sufficient to receive program data, even when communication with the omni-directional antenna is degraded (e.g., due to distance from the antenna device or physical obstructions). When appropriate, a directional beam from the directional antenna is directed towards the wireless device. The antenna device uses the directional antenna to receive program data from the wireless device.

When the antenna device has program data to send to a wireless device, the omni-directional antenna transmits a location request that requests the location of a wireless device. The omni-directional antenna receives a corresponding location signal, which indicates the location of the wireless device, from the wireless device. The location signal can be one or more bytes (e.g., of a clear to send ("CTS") signal) that indicate to the antenna device that the wireless device can receive data.

The location signal can include location data representing the location of the wireless device relative to the antenna device. Alternately, the antenna device may at least estimate the location of the wireless device based on the direction from which the location signal was received. The antenna device identifies that the wireless device is most likely within a range of a directional antenna selected from among the at least one directional antenna and uses the directional antenna to transmit program data to the wireless device.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
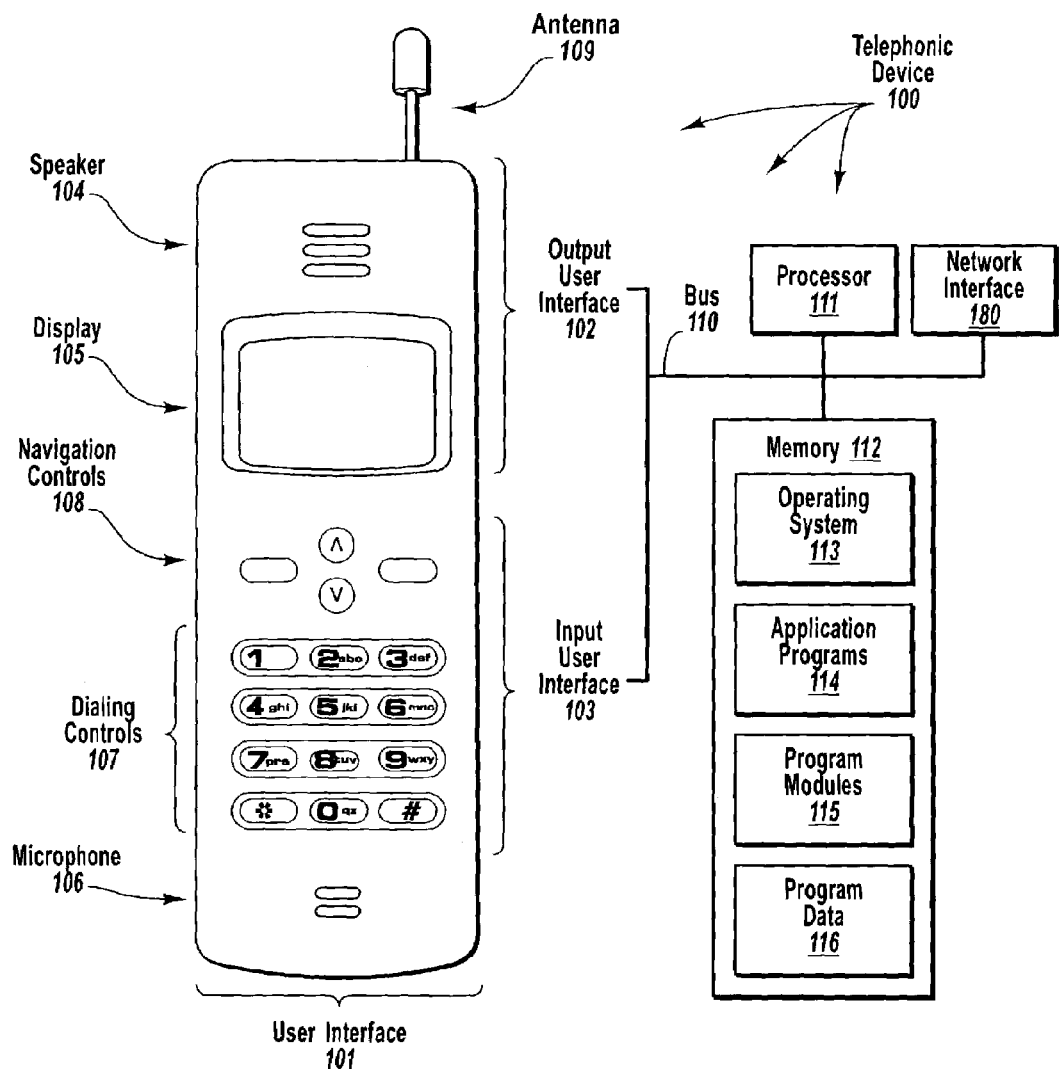
FIG. 1 illustrates a suitable operating environment for the principles of the present invention.

The principles of the present invention provides for using directional antennas to increase signal strength and enhance throughput in a wireless network. An antenna device includes an omni-directional antenna and at least one directional antenna Each directional antenna (e.g., an electronically steered phased array antenna).can have one or more feeds for directing beams to wireless devices. The antenna device can be an access point computer system that provides wireless devices access to a network, such as, for example, a Local Area Network or even the Internet.

The antenna device utilizes the omni-directional antenna to send and receive control data that facilitate locating wireless devices and determining a wireless device is ready to send program data to and/or receive program data from the antenna device. The antenna device utilizes directional antennas to send program data to and receive program data from wireless devices. Since the directional antenna uses directional beams, the range and barrier penetration of the directional antenna is greater than that of the omni-directional antenna. Accordingly, directional antennas can be used to increase signal strength and enhance throughput.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

In this description and in the following claims, "control data" is defined as data that can be used to control the operation of an antenna device. Control data includes antenna commands, data notification signals, location requests, and location signals.

In this description and in the following claims, "program data" is defined as data that is not associated with the control of an antenna device. Program data includes Web data, file transfer data, streaming audio/video ("A/V") data, or other information that may be exchanged between applications. Program data may be associated with more restrictive transmission requirements, such as, for example, increased bandwidth requirements, increased reliability, and reduced latency, relative to control data. Program data can be sent and/or received using a wide range of protocols, such as, for example, Internet Protocol ("IP") and Transmission Control Protocol ("TCP").

Those skilled in the art will appreciate that the invention may be practiced in network computing environments with many types of computer system configurations, including hubs, routers, wireless access points ("APs"), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a telephonic device 100. Telephonic device 100 includes a user interface 101 for allowing a user to input information through an input user interface 103, and review information presented at an output user interface 102. For example, the output user interface 102 includes a speaker 104 for presenting audio information to the user, as well as a display 105 for presenting visual information to the user. Although not required, telephonic device 100 may also have an antenna 109.

The input user interface 103 may include a microphone 106 for inputting audio information into telephonic device 100. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes processor 111, network interface 180, and memory 112 that are connected to each other and to the user interface 101 via system bus 110. The memory 112 generally represents a wide variety of volatile and/or non-volatile memories and may include types of memory previously discussed. However, the particular type of memory used in the telephonic device 100 is not important to the present invention. Program code means comprising one or more program modules may be stored in memory 112. The one or more program modules may include an operating system 113, one or more application programs 114, other program modules 115, and program data 116.

Telephonic device 100 is connectable to networks, such as, for example, an office-wide or enterprise-wide computer network, an intranet, and/or the Internet. Telephonic device 100 can wirelessly exchange data with external sources, such as, for example, remote computer systems and/or remote databases over such a network. Telephonic device 100 includes network interface 180 that can, when appropriate, interoperate with antenna 109 to receive data from external sources and/or transmit data to external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

For example, embodiments of the present invention may also be practiced with a laptop computer. The laptop computer can include a user input interface that receives information from an input device such as, for example, a keyboard, microphone, or mouse. The laptop computer can also include a video output interface that provides a video output signal to an integrated or external video display device, such as, for example, a color or monochrome computer monitor. The laptop computer can also include an audio output interface that provides an audio output signal to external audio output devices, such as, for example, speakers.

The laptop computer can also include a magnetic hard disk drive for reading from and writing to a magnetic hard disk. A magnetic hard disk drive and magnetic hard disk can provide nonvolatile storage of computer-executable instructions, data structures, program modules, and other data for the laptop computer. For example, a magnetic hard disk can store one or more program modules including an operating system, application programs, and program data.

The laptop computer can be connectable to networks, such as, for example, an office-wide or enterprise-wide computer network, an intranet, and/or the Internet. The laptop computer can wirelessly exchange data with external sources, such as, for example, remote computer systems and/or remote databases over such a network. The laptop computer can include a network interface, through which the laptop computer receives data from external sources and/or transmits data to external sources.

Modules of the present invention including control modules, as well as associated data, including control data, data notification signals, location requests, location signals, location data, and program data, may be stored and accessed from any of the computer-readable media associated with telephonic device 100 (or a laptop computer). For example, portions of such modules and portions of associated program data may be included in operating system 113, application programs 114, program modules 115, and/or program data 116, for storage in system memory 112. When a mass storage device, such as, for example, a magnetic hard disk, is coupled to telephonic device 100 (or a laptop computer), such modules and associated program data may also be stored at the mass storage device. In a networked environment, program modules depicted relative to telephonic device 100 (or a laptop computer), or portions thereof, can be stored in remote memory storage devices, such as, for example, system memory and/or mass storage devices associated with a remote computer system. Execution of such modules may be performed in a distributed environment as previously described.

Figure 2:
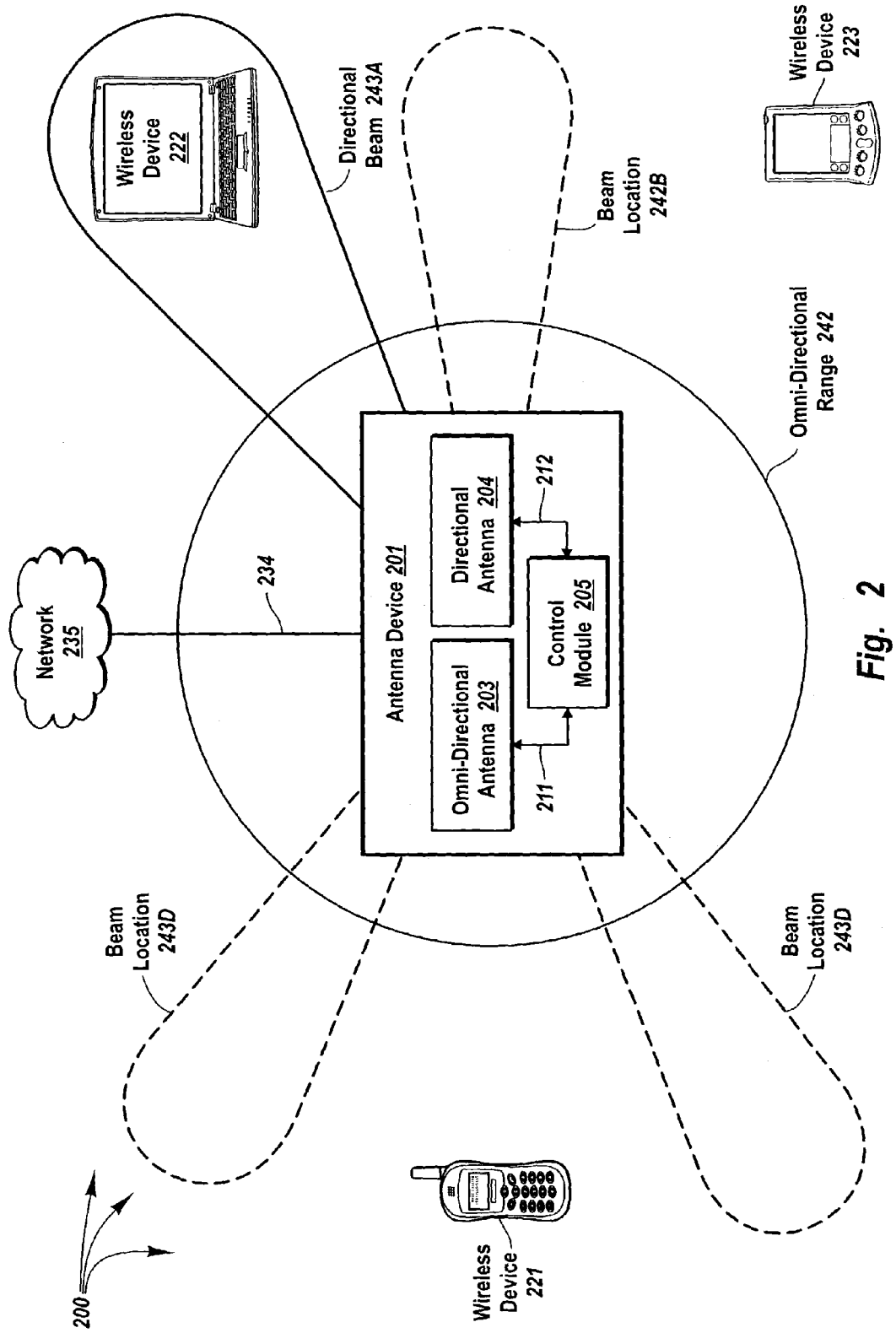
FIG. 2 illustrates an example network architecture that facilitates using a directional antenna to increase signal strength and enhance throughput in wireless networks in accordance with the principles of the present invention.

FIG. 2 illustrates an example network architecture 200 that facilitates using directional antennas to increase signal strength and enhance throughput in wireless networks. Depicted in network architecture 200 is antenna device 201, which may be an access point computer system or station computer system. Antenna device 201 can wirelessly communicate with wireless devices 221, 222, and 223 (which may each also be station computer systems) over common wireless channels, such as, for example, IEEE 802.11 channels. Antenna device 201 is further connected to network 235 via link 234. Link 234 can be a wired or wireless link that connects antenna device 201 to other network devices, such as, for example, other access points, routers, hubs, etc., included in network 235. Network 235 can be virtually any type of network, such as, for example, a local area network, a wide area network, or even the Internet. Accordingly, antenna device 201 may provide wireless devices 211, 222, and 223 with access to network 235.

Antenna device 201 includes omni-directional antenna 203, directional antenna 204, and control module 205. Omni-directional antenna 203 has a range of omni-directional range 242. Inside omni-directional range 242, omni-directional antenna 203 may have sufficient signal strength to send and receive program data from wireless devices. On the other hand, outside of omni-directional range 242, omni-directional antenna 203 may not have sufficient signal strength to send and receive program data from wireless devices. For example, outside of omni-directional range 242, omni-directional antenna 203 may not have sufficient signal strength to sufficiently receive streaming A/V data.

However, outside of omni-directional range 242, omni-directional antenna 203 may have sufficient signal strength to send and receive control data. For example, outside of omni-directional range 242, omni-directional antenna 203 may have sufficient signal strength to receive a data notification signal. Even within omni-directional range 242, it may be that communication is degraded due to physical barriers, such as, for example, floors, ceilings, walls, and buildings. Thus, communication within omni-directional range 242 can be degraded such that omni-directional antenna 203 may have sufficient signal strength to transfer control data but not sufficient signal strength to transfer program data. It may also be that a combination of range from antenna device 201 and physical barriers cause communication with antenna device 201 to be degraded.

Directional antenna 204 (e.g., an electronically steered phased array antenna) can include one or more feeds for directing beams at wireless devices. Beams can be directed at wireless devices that are to send program data to and/or receive program data from antenna device 201. For example, when wireless device 222 has program data to send to antenna device 201, directional beam 243A can be directed at wireless device 222. Although antenna device 201 is depicted as having a signal directional antenna (i.e., directional antenna 204), it may be that antenna device 201 includes a plurality of directional antennas. Accordingly, antenna device 201 can be configured to communicate through a plurality of directional beams from different directional antennas simultaneously.

The dashed lines representing beam locations 243B, 243C, and 243D, represent some of the locations a where a directional beam from directional antenna 204 can be directed. However, it should be understood that the beam locations 243B, 243C, and 243D are merely illustrative and that a directional beam can be directed in virtually any direction. This includes directing directional beams in directions above and/or below an antenna device to communicate with wireless devices in those locations. For example, directional antenna 204 can direct a directional beam in directions above and/or below antenna device 201 (e.g., to a wireless device on a floor above or below antenna device 201).

Omni-directional antenna 203 and directional antenna 204 are connected to control module 205 by corresponding links 211 and 212 respectively. Links 211 and 212 can be part of a system bus (e.g., bus 110) or Local Area Network ("LAN") connection. Control module 205 can send program data to and receive data from omni-directional antenna 203 and directional antenna 204 over the corresponding links 211 and 212. Control module 205 can also send control data, such as, for example, antenna commands, to omni-directional antenna 203 and directional antenna 204 over the corresponding links 211 and 212. Antenna commands can cause the configuration of omni-directional antenna 203 and directional antenna 204 to change (e.g., to cause directional antenna 204 to direct a directional beam at a wireless device). Accordingly, control module 205 can interoperate with omni-directional antenna 203 and directional antenna 204 to implement the principles of the present invention.

For example, control module 205 can cause omni-directional antenna 203 to listen for data notification signals indicating that a wireless device has data to send to antenna device 201. When omni-directional antenna 203 receives a data notification signal, control module 205 can then cause a directional beam of directional antenna 204 to be directed towards the location of a wireless device. Further, when antenna device 201 has data to send to a wireless device, control module 205 can cause omni-directional antenna 203 to transmit a location request and listen for a corresponding location signal. Control module 205 can process a corresponding location signal and cause a directional beam to be directed towards the location of a wireless device. Control module 205 can also cause omni-directional antenna 203 and/or directional antenna 204 to detect signal strength associated with received communication.

Figure 3:
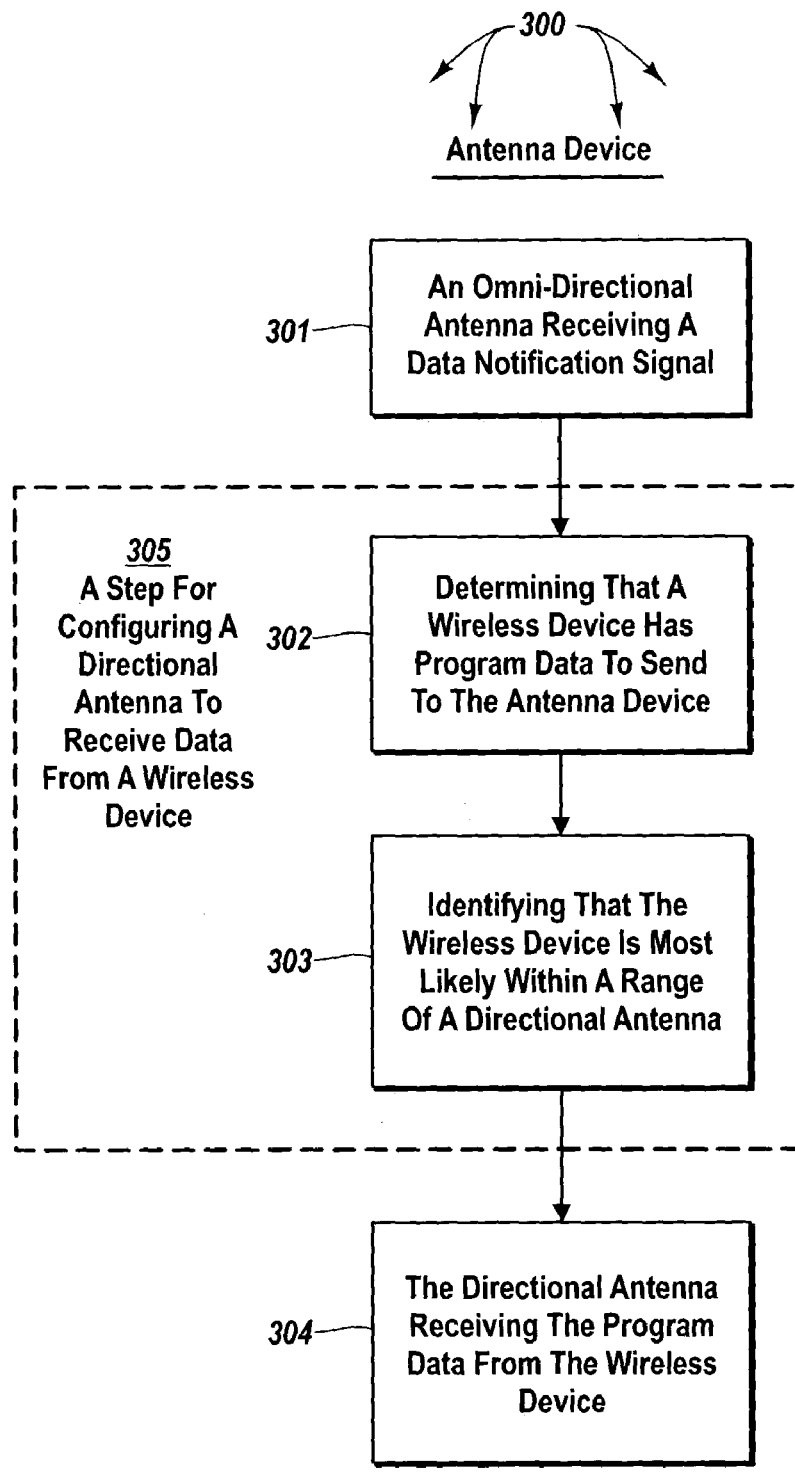
FIG. 3 illustrates an example flowchart of a method for an antenna device to receive program data in accordance with the principles of the present invention.

FIG. 3 illustrates an example flowchart of a method 300 for an antenna device to receive program data in accordance with the principles of the present invention. The method 300 will be discussed with respect to the antenna device and wireless devices depicted in network architecture 200.

The method 300 includes an act of an omni-directional antenna receiving a data notification signal (act 301). Act 301 can include an omni-directional antenna receiving a data notification signal from a wireless device. For example, omni-directional antenna 203 can receive a data notification signal from wireless device 222. A data notification signal can be indicative of the wireless device having program data to transmit to an antenna device. For example, a data notification signal from wireless device 222 can be indicative of wireless device 222 having program data to send to antenna device 201. A data notification signal can be one or more bytes (e.g., of a request to send ("RTS") signal) that indicate to the antenna device that the wireless device has program data to send.

The method 300 includes a functional, result-oriented step for configuring a directional antenna to receive data from a wireless device (step 305). Step 305 can include any corresponding acts for configuring a directional antenna to receive data from a wireless device. However, in the illustrated example of FIG. 3, step 305 includes a corresponding act of determining that a wireless device has program data to send to the antenna device (act 302.)

Act 302 can include the antenna device determining that the wireless device has program data to send to the antenna device based on a received data notification signal. For example, based on a data notification signal received from wireless device 222, control module 205 can determine that the data notification signal is indicative of wireless device 222 having program data to send to antenna device 201. Control module 205 can process one or more bytes of a RTS signal to determine that a data notification signal is indicative of a wireless device having program data to send.

Step 305 also includes a corresponding act of indentifying that the wireless device is most likely within a range of a directional antenna (act 303). Act 303 can include the antenna device identifying that the wireless device is most likely within a range of a directional antenna (e.g., selected from among one or more directional antennas at the antenna device). For example, antenna device 201 can identify that wireless device 222 (or wireless device 221 or 223) is most likely within a range of directional antenna 204.

Control module 205 can analyze the characteristics (e.g., detected signal strength) of a data notification signal to at least estimate whether or not a directional beam from directional antenna 204 would have sufficient signal strength to receive program data. For example, based on the signal strength associated with a data notification signal (e.g., as detected at omni-directional antenna 203), control module 205 can at least estimate that the signal strength of directional antenna 204 is sufficient for receiving program data from wireless device 222. Since directional beams are directed to less area than the area covered by an omni-directional antenna, the signal strength of a directional beam can be greater that of an omni-directional antenna of the same gain. The greater signal strength of a directional beam may be sufficient to send program data to and/or receive program data from a wireless device (potentially at an increased data rate), even when communication between the omni-directional antenna and the wireless device is degraded (e.g., due to distance from the antenna device or physical barriers). Based on a received data notification signal, antenna device 201 can also determine the location of wireless device 222.

The range of a directional beam from a directional antenna can be as much as twice that of an omni-directional antenna of the same gain. Accordingly, a directional beam may have sufficient signal strength to communicate with wireless devices outside of an omni-directional range. For example, directional antenna 204 may be able to utilize a directional beam to communicate with wireless devices outside of omni-directional range 242. Further, even within an omni-directional range, a directional beam from a directional antenna can have greater signal strength. Accordingly, when an omni-directional antenna lacks the signal strength due to physically barriers, a directional beam from a directional antenna may nonetheless have sufficient signal strength to send program data to and/or receive program data from a wireless device (potentially at an increased data rate). For example, directional beam 243A may have sufficient signal strength to communicate with a wireless device inside omni-directional range 242 that is separated from antenna device 201 by physical barriers.

When appropriate, control module 205 can cause a directional beam from directional antenna 204 to be directed at a wireless device. When wireless device 222 has program data to send to antenna device 201 but no directional beam is currently directed at wireless device 222, control module 205 can cause a directional beam to be directed at wireless device 222. For example, control module 205 can cause directional beam 243A to be directed at wireless device 222. The method 300 includes an act of receiving program data from the wireless device at the directional antenna (act 304). Act 304 can include an antenna device using the directional antenna (e.g., the directional antenna selected from among the one or more directional antennas at the antenna device) to receive program data from a wireless device in response to having received a data notification signal. For example, in response to a data notification signal from wireless device 222, antenna device 201 can receive program data from wireless device 222 via directional beam 243A.

It may be that an application in network 235 (or even at antenna device 201), such as, for example, a Web server or electronic mail server, has program data to send to a wireless device. Accordingly, the application can indicate to antenna device 201 that program data is to be sent to the wireless device. Antenna device 201 can receive the program data and subsequently forward the program data to the appropriate wireless device. For example, if a Web server indicates that a Web page is to be delivered to wireless device 221, antenna device 201 can receive the Web page and subsequently forward the Web page to wireless device 221.

Figure 4:
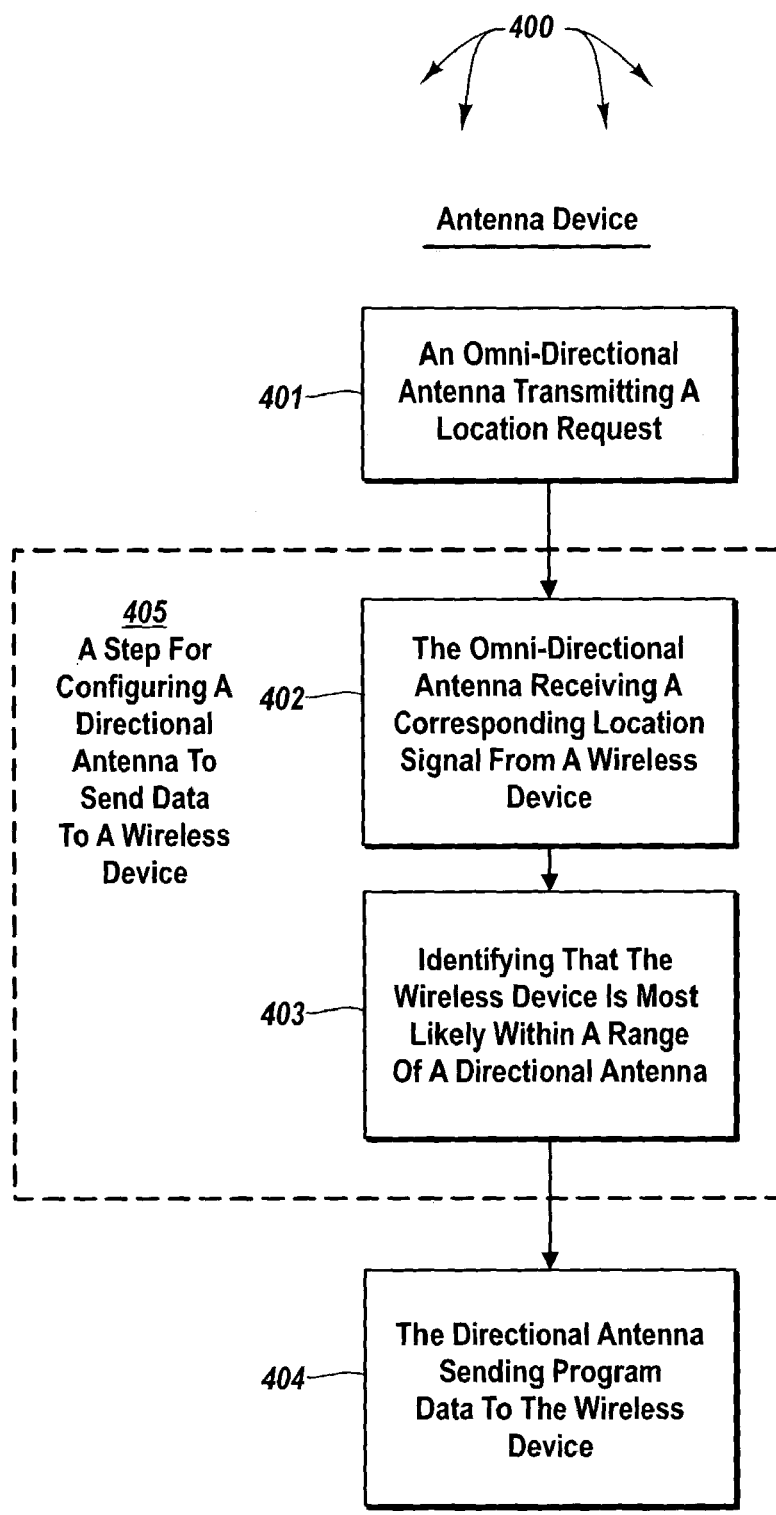
FIG. 4 illustrates an example flowchart of a method for an antenna device to send program data in accordance with the principles of the present invention.

FIG. 4 illustrates an example flowchart of a method 400 for an antenna device to send program data in accordance with the principles of the present invention. The method 400 will be discussed with respect to the antenna device and wireless devices depicted in network architecture 200. The method 400 includes an act of an omni-directional antenna transmitting a location request (act 401). Act 401 can include an omni-directional transmitting a location request that requests the location of a wireless device. For example, omni-directional antenna 203 can transmit a location request (potentially including a RTS signal) requesting the location of wireless device 221.

It may that a wireless device does not receive a location request due to the range and/or physical barriers separating the wireless device from an antenna device. For example, wireless device 221 may be some distance outside of omni-directional range 242 and/or may be separated from antenna device 201 by one or more walls. On the other hand, when conditions are appropriate, a wireless device may receive a location request. For example, omni-directional antenna 203 may have sufficient strength to cause a location request reach wireless device 221. Accordingly, wireless device 221 can respond to the location request by transmitting a location signal. For example, wireless device 221 can transmit a location signal indicating the location of wireless device 221.

The method 400 includes a functional, result-oriented step for configuring a directional antenna to send data to a wireless device (step 405). Step 405 can include any corresponding acts for configuring a directional antenna to send data to a wireless device. However, in the illustrated example of FIG. 4, step 405 includes a corresponding act of the omni-directional antenna receiving a location signal from a wireless device (act 402). Act 402 can include the omni-directional antenna receiving a corresponding location signal that was transmitted from a wireless device in response to receiving the location request. For example, wireless device 222 can respond to a location request by transmitting a corresponding location signal.

The location signal may be one or more bytes (e.g., of a clear to send ("CTS") signal) that indicate to the antenna device that the wireless device can receive program data. The location signal can include location data representing the location of the wireless device relative to the antenna device. Control module 205 can process the location data to calculate the location of wireless device 222. Alternately, control module 205 may at least estimate the location of the wireless device based on the direction from which the location signal was received.

Step 405 also includes a corresponding act of identifying that the wireless device is most likely within a range of a directional antenna (act 403). Act 403 can include the antenna device identifying that the wireless device is most likely within a range of the directional antenna (e.g., selected from one or more directional antennas at the antenna device). For example, antenna device 201 can identify that wireless device 222 (or wireless device 221 or 223) is most likely within a range of directional antenna 204. When appropriate, control module 205 can direct a directional beam from directional antenna 204 towards a wireless device. For example, control module 205 can cause directional beam 243A to be directed at wireless device 222.

The method 400 includes an act of sending program data from the directional antenna to the wireless device (act 404). Act 404 can include an antenna device using the directional antenna (e.g., the directional antenna selected from among the one or more directional antennas at the antenna device) to send data to a wireless device in response to having received a location signal. For example, in response to receiving a location signal from wireless device 222, directional antenna 204 can send program data to wireless device 222 via directional beam 243A.

In some embodiments, antenna device 201 communicates with a plurality of wireless devices simultaneously. Accordingly, different directional beams can be used to communicate with each wireless device. For example in FIG. 2, directional beam 243A can be used for communication with wireless device 222 and a directional beam directed at wireless device 221 can used for communication with wireless device 221. Accordingly, antenna device 201 can be configured to simultaneously communicate with a plurality of wireless devices through directional beams, even when the wireless devices are located in different directions relative to antenna device 201.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an antenna device that includes an omni-directional antenna and at least one directional antenna, a method for reducing effects associated with propagation loss including reduced data rate exchange, data unreliability, or loss of data, in order to receive data from a wireless device in a power efficient manner, the method comprising:

an act of receiving at an omni-directional antenna a data notification signal from a wireless device, which is control data indicating that a wireless device has program data to transmit to an antenna device that includes both the omni-directional antenna and at least one directional antenna, both of which are configured to receive program data, control data, or both, from a wireless device;

based on the received data notification signal, an act of determining that the wireless device has program data to send to the antenna device, wherein the program data requires higher signal strength for reliable transfer than control type data;

an act of determining that the wireless device is likely unable to reliably send program data to the antenna device through the omni-directional antenna due to limited signal strength with the omni-directional antenna caused by limited range of the omni-directional antenna, physical barriers between the omni-directional antenna and the wireless device, or both; and based on the determination that the wireless device is likely unable to reliably send the program data to the antenna device through the omni-directional antenna, an act of using the at least one directional antenna to receive program data from the wireless device for transfer to the antenna device in response to having received the data notification signal.

2. The method as recited in claim 1, wherein the act of the omni-directional antenna receiving a data notification signal from the wireless device comprises an act of the omni-directional antenna receiving a ready to send signal.

3. The method as recited in claim 1, wherein the act of the antenna device determining that the wireless device has program data to transmit to the antenna device comprises act of processing a ready to send signal.

4. The method as recited in claim 1, wherein the act of determining that the wireless device is likely unable to reliably send program data to the antenna device through the omni-directional antenna comprises an act of analyzing the characteristics of the data notification signal.

5. The method as recited in claim 4, wherein the act of analyzing the characteristics of the data notification signal comprises an act of detecting the signal strength associated with the data notification signal.

6. The method as recited in claim 1, wherein the act of determining that the wireless device is likely unable to reliably send program data to the antenna device through the omni-directional antenna comprises an act of determining that a directional beam from one of the at least one directional antennas has sufficient signal strength to receive program data from the wireless device.

7. The method as recited in claim 1, wherein the act of determining that the wireless device is likely unable to reliably send program data to the antenna device through the omni-directional antenna comprises an act of determining the location of the wireless device.

8. The method as recited in claim 1, further comprising:
an act of the antenna device directing a directional beam from the one of the at least one directional antennas towards the wireless device in response to having received the data notification signal.

9. The method as recited in claim 1, wherein the act of the antenna device using the one of the at least one directional antennas to receive program data from the wireless device comprises an act of receiving program data that was transported in accordance with the Internet Protocol.

10. The method as recited in claim 1, wherein the act of the antenna device using the one of the at least one directional antennas to receive program data from the wireless device comprises an act of using an electronically steered phased array antenna to receive program data from the wireless device.

11. The method as recited in claim 1, wherein the act of the antenna device using the one of the at least one directional antennas to receive program data from the wireless device comprises an act of simultaneously using a first directional beam to receive program data from the wireless device and using a second directional beam to communicate with a second wireless device.

12. The method as recited in claim 1, further comprising:
an act of the antenna device simultaneously using another of the at least one directional antennas to communicate with a second wireless device during reception of the program data from the wireless device.

13. In an antenna device that includes an omni-directional antenna and at least one directional antenna, a method for reducing effects associated with propagation loss including reduced data rate exchange, data unreliability, or loss of data, in order to receive data from a wireless device in a power efficient manner, the method comprising:
an act of receiving at an omni-directional antenna a data notification signal from a wireless device, which is control data indicating that a wireless device has program data to transmit to an antenna device that includes the omni-directional antenna and at least one directional antenna for receiving both program data and control data from a wireless device;
a step for configuring one of the at least one directional antennas to receive program data from the wireless device, wherein the program data requires higher signal strength for reliable transfer than control type data; and
based on a determination that the wireless device is likely unable to reliably send the program data to the antenna device through the omni-directional antenna, an act of the antenna device using the one of the at least one directional antennas to receive program data from the wireless device in response to having received the data notification signal.

14. In an antenna device that includes an omni-directional antenna and at least one directional antenna, a method for reducing effects associated with propagation loss including reduced data rate exchange, data unreliability, or loss of data, in order to send data to a wireless device in a power efficient manner, the method comprising:
an act of transmitting from an omni-directional antenna a location request, the location request requesting the location of a wireless device;
an act of receiving at the omni-directional antenna a location signal from the wireless device, the location signal indicating the location of the wireless device, wherein the location signal is control data;
an act of identifying by an antenna device—that includes the omni-directional antenna and a directional antenna—that the wireless device is likely unable to reliably receive program data from the antenna device through the omni-directional antenna due to limited signal strength with the omni-directional antenna caused by limited range of the omni-directional antenna, physical barriers between the omni-directional antenna and the wireless device, or both; and
based on the determination that the wireless device is likely unable to reliably receive program data through the omni-directional antenna, an act of using the at least one directional antennas to send the program data from the antenna device to the wireless device in response to having received the location signal.

15. The method as recited in claim 14, further comprising:
an act of receiving an indication that an application has program data to send to the wireless device.

16. The method as recited in claim 14, wherein the act of the omni-directional antenna receiving a location signal from the wireless device comprises an act of the omni-directional antenna receiving a clear to send signal.

17. The method as recited in claim 14, wherein the act of the omni-directional antenna receiving a location signal from the wireless device comprises an act of the omni-directional antenna receiving location data indicating the location of the wireless device.

18. The method as recited in claim 14, wherein the act of identifying by the antenna device that the wireless device is likely unable to reliably receive program data from the antenna device through the omni-directional antenna due to limited signal strength comprises an of act calculating the location of the wireless device based on received location data.

19. The method as recited in claim 14, wherein the act of identifying by the antenna device that the wireless device is likely unable to reliably receive program data from the antenna device through the omni-directional antenna due to limited signal strength comprises an act of at least estimating the location of the wireless device based on the direction from which the location signal was received.

20. The method as recited in claim 14, wherein the act of identifying by the antenna device that the wireless device is likely unable to reliably receive program data from the antenna device through the omni-directional antenna due to limited signal strength comprises an act of detecting the signal strength associated with the location signal.

21. The method as recited in claim 14, wherein the an act of identifying by the antenna device that the wireless device is likely unable to reliably receive program data from the antenna device through the omni-directional antenna due to limited signal strength comprises an act of determining that a directional beam from one of the at least one directional antennas has sufficient signal strength to send program data to the wireless device.

22. The method as recited in claim 14, further comprising:
an act of the antenna device directing a beam of from one of the at least one directional antennas towards the wireless device in response to having received the location signal.

23. The method as recited in claim 14, wherein the act of using the at least one directional antennas to send the program data from the antenna device to the wireless device comprises an act of sending program data that is to be transported in accordance with the Internet Protocol.

24. The method as recited in claim 14, wherein the act of using the at least one directional antennas to send the program data from the antenna device to the wireless device comprises an act of using an electronically steered phased array antenna to send program data to the wireless device.

25. The method as recited in claim 14, wherein the act of using the at least one directional antennas to send the program data from the antenna device to the wireless device comprises an act of simultaneously using a first directional beam to send program data to the wireless device and using a second directional beam to communicate with a second wireless device.

26. The method as recited in claim 14, further comprising:
an act of the antenna device simultaneously using another of the at least one directional antennas to communicate with a second wireless device during the sending of the program data to the wireless device.

27. In an antenna device that includes an omni-directional antenna and at least one directional antenna, a method for reducing effects associated with propagation loss including reduced data rate exchange, data unreliability, or loss of data, in order to send data to a wireless device in a power efficient manner, the method comprising:
an act of transmitting from an omni-directional antenna a location request, which is control data that requests the location of the wireless device;
an act of determining that an antenna device—that includes the omni-directional antenna and at least one directional antenna—has program data to send to the wireless device, wherein the program data requires higher signal strength for reliable transfer than control type data;
based on a determination that the wireless device is likely unable to reliably receive the program data through the omni-directional antenna, a step for configuring the at least one directional antenna to send program data to the wireless device; and
an act of the antenna device using the at least one directional antenna to send the program data to the wireless device in response to having received the location signal.

28. A computer program product for use in an antenna device that includes an omni-directional antenna and at least one directional antenna, the computer program product for implementing a method for reducing effects associated with propagation loss including reduced data rate exchange, data unreliability, or loss of data, in order to receive data from a wireless device in a power efficient manner, the computer program product comprising one or more computer-readable media having stored thereon computer executable instructions that, when executed by a processor, cause the antenna device to perform the following:
receive a data notification signal at an omni-directional antenna, the data notification signal being control data that indicates that a wireless device has program data to transmit to antenna device that includes both the omni-directional antenna and at least one directional antenna, both of which are configured to receive program data, control data, or both, from a wireless device;
based on the received data notification signal, determine that the wireless device has program data to transmit to the antenna device, wherein the program data requires higher signal strength for reliable transfer than control type data;
determine that the wireless device is likely unable to reliably send program data to the antenna device through the omni-directional antenna due to limited signal strength with the omni-directional antenna caused by limited range of the omni-directional antenna, physical barriers between the omni-directional antenna and the wireless device, or both; and
based on the determination that the wireless device is likely unable to reliably send the program data to the antenna device through the omni-directional antenna, use the at least one directional antenna to receive program data from the wireless device for transfer to the antenna device in response to having received the data notification signal.

29. The computer program product as recited in claim 28, wherein the one or more computer-readable media are physical media.

30. The computer program product as recited in claim 28, wherein the one or more computer-readable media include system memory.

31. A computer program product for use in an antenna device that includes an omni-directional antenna and at least one directional antenna, the computer program product for implementing a method for reducing effects associated with propagation loss including reduced data rate exchange, data unreliability, or loss of data, in order to send data to a wireless device in a power efficient manner, the computer program product comprising one or more computer-readable media having stored thereon computer executable instructions that, when executed by a processor, cause the antenna device to perform the following:
transmit a location request from an omni-directional antenna, the location request being control data that requests the location of a wireless device;
receive a corresponding location signal at the omni-directional antenna, the location signal is control data indicating the location of the wireless device;
identify that the wireless device is likely unable to reliably receive program data from the antenna device through the omni-directional antenna due to limited signal strength with the omni-directional antenna caused by limited range of the omni-directional antenna, physical barriers between the omni-directional antenna and the wireless device, or both; and
based on the determination that the wireless device is likely unable to reliably receive program data through the omni-directional antenna, use the at least one directional antenna to send the program data to the wireless device in response to having received the location signal.

32. The computer program product as recited in claim 31, wherein the one or more computer-readable media are physical media.

33. The computer program product as recited in claim 31, wherein the one or more computer-readable media include system memory.

34. An antenna device configured to wirelessly communicate with wireless devices in a way that reduces effects associated with propagation loss including reduced data rate exchange, data unreliability, or loss of data, the antenna device comprising the following:
an omni-directional antenna;
one or more directional antennas, each directional antenna having one or more feeds for directing beams at wireless devices;
one or more processing units; and
one or more computer-readable media having stored thereon a control module, the control module being configured to:

exchange control data with the omni-directional antenna, the control data indicating that a wireless device is to exchange program data with the antenna device;

identify that a wireless device is likely unable to reliably receive program data through the omni-directional antenna due to limited signal strength caused by limited range of the omni-directional antenna, physical barriers between the omni-directional antenna and the wireless device, or both; and exchange program data—that typically requires higher signal strength for reliable transfer than control data—with the wireless device through the one of the one or more directional antennas in response to the exchanged control data.

\* \* \* \* \*